Patented Apr. 2, 1940

2,196,146

UNITED STATES PATENT OFFICE 2,196,146

FOOD PRODUCT AND PROCESS FOR MAKING THE SAME

William Rowland Collins, Woodhaven, N. Y., assignor, by mesne assignments, to Standard Brands Incorporated, New York, N. Y., a corporation of Delaware No Drawing. Application December 3, 1928, Serial No. 323,578

13 Claims. (Cl. 99—130)

The invention relates to improved food products and process for making the same, and particularly to food products containing sugar and acid, such as those commonly known as gelatin desserts that generally are marketed in the form of a dry powder and usually comprise gelatin, together with sugar and acid (usually accompanied by a suitable flavor), to which hot water may be added to make a solution setting on cooling into the comestible.

The practical value of food products depends upon their palatability and convenience of use by the consumer. Chiefly on account of considerations of palatability, the presence of both sugar and acid is considered essential to the commercial value of such products, the agreeable taste or flavor resulting in part from the presence of the acid presumably as a result of the ionizing thereof in the solution. But the presence of sugar and acid has occasioned practical difficulties in use by the consumer, particularly in that the product tends to cake before use (presumably as a result of the inversion of the sugar content owing to the presence of the acid), rendering its satisfactory use tedious and difficult. The presence of the acid in the quantities used has made the time required for the setting of the solution of the product inconveniently long. The problem to which the present invention is addressed has been to devise means to minimize the caking tendency and preserve the palatability of such products resulting largely from the presence of the acid and, at the same time, materially speed the time of the setting of the solution.

The invention has resulted from the discovery that certain substances may be added without impairing the palatability and accomplishing the desired ends of quickening setting and practically preventing objectionable caking. The substances found useful are salts of organic acids as tartrates, lactates, acetates or citrates and preferably sodium bitartrate or of weak inorganic acids as borates. The addition of a base or alkali tends to accomplish some of the desired ends, but has been found to impair the palatability by reducing the taste to one that may be characterized as flat. Various other substances have been found either to effect no material improvement or to affect the palatability. The substances found suitable are substances which increase the pH value of the solution of the product by repressing the ionization of the acid without affecting the palatability, as the salts just mentioned, which are herein called buffer salts.

The quantity to be added for the best results depends upon the character of the mixture and particularly upon the optimum hydrogen ion concentration of its solution. It has been found that if by suitable means, the pH value of a solution of a gelatin dessert is progressively raised toward the pH value of the isoelectric point of gelatin, the quicker is the set, but other considerations make it desirable not to press that discovery to the extreme in practice. Taking pH value 4.7 as representing the isoelectric point of gelatin, the most satisfactory product has been found to be one wherein the pH value is between 3 and 4 with optimum about 3.55. A representative mixture of a gelatin dessert contains about 10 per cent gelatin, about 85 per cent sugar, about 2 per cent tartaric acid and a small amount of flavor. A proper addition to such a mixture to accomplish the objects of the invention will be an amount of the salt sufficient to repress the ionization of the acid in so far as that can be accomplished without affecting it in a way materially to impair its function in increasing the palatability of the comestible or adding the taste of the salt thereto, which in the case of tartaric acid will be a molecularly equivalent amount of tartrate.

In practice it is preferred to add to the mixture the salt combined with the acid. Thus in a preferred form about 10 per cent gelatin, a little less than 85 per cent sugar, about 4 per cent sodium bitartrate (with a small amount of flavor) are mixed thoroughly and dried, making a product which may be distributed without an objectionable tendency to cake and capable of setting when in solution much more quickly than similar products heretofore known.

Some gelatin desserts are not in the form of a dry powder but are produced by dissolving the necessary constituents in a small quantity of water or other menstruum and allowing the resulting concentrated gelatin solution to set. This product is then in the form of a very stiff gel and is prepared for use by dissolving in required amount of water and allowing to set. The invention disclosed herein applies to products in the dry form or in the stiff gel form or in other forms.

The following claims are made:

1. An edible gelatin food product comprising gelatin, sugar and sodium bitartrate, the ingredients being so proportioned as to form with a flavor a palatable quick setting gelatin dessert, the sodium bitartrate being present in an amount sufficient to yield with water, a solution of the product having a pH value of 3 to 4.7.

2. A process for making an edible dry gelatin dessert powder comprising mixing a flavor into a mixture containing gelatin, sugar acid and a buffer salt, and drying.

3. An edible gelatin food product having the following approximate composition: gelatin 10%, sugar 85%, sodium bitartrate about 4% and a small amount of flavor.

4. In an edible gelatin composition the combination of an edible mixture of sugar, gelatin and fruit acid with a buffer comprising a salt of a strong base and a weak acid, said salt being present in an amount sufficient to speed materially the setting of a water solution thereof by repressing the ionization of the acid without deleteriously affecting the palatability.

5. A gelatin dessert, containing an edible mixture of sugar, gelatin, flavor and acid with a buffer comprising a salt of a strong base and a weak acid, a hot aqueous solution thereof when cooled being adapted quickly to set to a firm gel comestible which is characterized by improved palatability and agreeable taste and flavor in part attributable to the presence of the acid, the ionization of the acid having been repressed by the salt so that the setting time of the solution is materially speeded without impairment of palatability and other desirable characteristics of the comestible.

6. A gelatin dessert, containing an edible mixture of sugar, gelatin, flavor and acid with a buffer comprising a salt of a strong base and a weak acid, a hot aqueous solution thereof when cooled being adapted quickly to set to a firm gel comestible which is characterized by improved palatability and agreeable taste and flavor in part attributable to the presence of the acid, the ionization of the acid in the solution having been repressed by the salt to a pH value of 3 to 4.7 whereby the setting time of the solution is materially speeded without impairment of palatability and other desirable characteristics of the comestible.

7. An edible gelatin food product comprising a mixture of gelatin, sugar, acid, flavor and a buffer salt, said mixture being in the form of a dry powder, said salt being of a character and in a quantity sufficient to minimize the caking tendency of the dry mixture and to speed materially the setting of a water solution thereof by repressing the ionization of the acid, without deleteriously affecting the palatability.

8. An edible gelatin food product comprising a mixture of gelatin, acid and a buffer salt, said acid being of a character and in an amount to increase the palatability of the product, said salt being of a character and in a quantity to speed materially the setting of a water solution of said mixture by repressing the ionization of the acid, without deleteriously affecting the palatability.

9. In a process for making edible gelatin desserts containing gelatin and acid, the introduction to the mixture of a buffer salt of a character and in a quantity to speed materially the setting of a water solution thereof by repressing the ionization of the acid, without deleteriously affecting the palatability.

10. In a process for making an edible dry gelatin food product containing gelatin, sugar and acid, the improvement which consists in incorporating therein a buffer salt in an amount sufficient to minimize the caking tendency of the product and to speed materially the setting of a water solution thereof by repressing the ionization of the acid to a pH value of 3 to 4.7, without deleteriously affecting the palatability.

11. In a process for making an edible dry gelatin food product containing gelatin and sugar; the improvement which consists in incorporating therein sodium bitartrate in an amount sufficient to minimize the caking tendency of the product and to cause the product to yield with water, a solution having a pH value of about 3.55, whereby to speed materially the setting thereof, without deleteriously affecting the palatability.

12. An edible dry gelatin food product comprising gelatin, sugar, acid, and a buffer salt of a weak acid in an amount sufficient to minimize the caking tendency of the product and to speed materially the setting of a water solution thereof by repressing the ionization of the acid, without deleteriously affecting the palatability.

13. A gelatin food product comprising gelatin, sugar, fruit acid, and an edible salt of an acid selected from the group consisting of tartaric, lactic, acetic and citric acids; the amounts of gelatin and acid being substantially in the relative proportions of about 10:2 and the salt being present in an amount sufficient to speed materially the setting of a water solution of said product by repressing the ionization of the acid, without deleteriously affecting the palatability.

W. ROWLAND COLLINS.